(12) United States Patent
Yamaya et al.

(10) Patent No.: US 7,763,678 B2
(45) Date of Patent: Jul. 27, 2010

(54) ANTI-SMUDGE AGENT, SMUDGE PROOF COATING COMPOSITION, SMUDGE PROOF FILM, AND ARTICLE COATED WITH SMUDGE PROOF FILM

(75) Inventors: Masaaki Yamaya, Annaka (JP); Kazuharo Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 522 days.

(21) Appl. No.: 11/783,846

(22) Filed: Apr. 12, 2007

(65) Prior Publication Data

US 2007/0243394 A1    Oct. 18, 2007

(30) Foreign Application Priority Data

Apr. 14, 2006   (JP) ............................. 2006-112110

(51) Int. Cl.
*C08L 83/04* (2006.01)
*C08G 77/24* (2006.01)
*B32B 9/04* (2006.01)

(52) U.S. Cl. .................. 524/588; 524/268; 528/42; 428/447

(58) Field of Classification Search .................. 524/588, 524/268, 4; 528/42, 36
See application file for complete search history.

(56) References Cited

U.S. PATENT DOCUMENTS 5,464,704 A * 11/1995 Yoneda et al. .............. 428/429
6,558,804 B2   5/2003 Sato et al.
6,716,534 B2 *  4/2004 Moore et al. ................ 428/447
6,855,375 B2 *  2/2005 Nakagawa et al. .......... 427/387
7,141,305 B2 * 11/2006 Nakagawa et al. .......... 428/447

FOREIGN PATENT DOCUMENTS

| JP | 6-29332 B2 | 4/1994 |
| JP | 2629813 B2 | 4/1997 |
| JP | 2000-119634 A | 4/2000 |
| JP | 2002-53804 A | 2/2002 |

* cited by examiner

*Primary Examiner*—Randy Gulakowski
*Assistant Examiner*—Kara Negrelli
(74) *Attorney, Agent, or Firm*—Birch, Stewart, Kolasch & Birch LLP

(57) ABSTRACT

An anti-smudge agent which is added to a coating composition for imparting smudge proof property with the coating composition, comprising a silicone resin containing a fluorine atom-containing organic group, which has a number average molecular weight of at least 1,000 and a molar ratio of the fluorine atom to the silicon atom (F/Si) of 3 to 50, said silicone resin being produced by hydrolyzing or condensing an organosilicon compound having a fluorine atom-containing organic group represented by the following general formula (I):

$$R^1R^2_mSiX_{3-m} \qquad (I)$$

wherein $R^1$ is a fluorine atom-containing organic substituent, $R^2$ is a substituted or unsubstituted alkyl group or phenyl group containing 1 to 10 carbon atoms, X is a hydrolyzable group or OH group, and m is 0 or 1; or a hydrolysate or a partial condensate thereof.

10 Claims, No Drawings

ANTI-SMUDGE AGENT, SMUDGE PROOF COATING COMPOSITION, SMUDGE PROOF FILM, AND ARTICLE COATED WITH SMUDGE PROOF FILM

CROSS-REFERENCE TO RELATED APPLICATION

This non-provisional application claims priority under 35 U.S.C. §119(a) on Patent Application No. 2006-112110 filed in Japan on Apr. 14, 2006, the entire contents of which are hereby incorporated by reference.

TECHNICAL FIELD

This invention relates to an anti-smudge agent comprising a silicone resin which contains fluorine atom at a high content and which has a molecular weight higher than a certain level. When this anti-smudge agent is added to a coating agent commonly used in the art, the silicone resin of the present invention moves toward the surface to become oriented, and the resulting coating will be provided with a surface having a durable smudge proof property. This invention also relates to a smudge proof coating composition, a smudge proof film, and an article coated with such film.

The smudge proof coating composition according to the present invention may be used in the field where durable smudge proof property (smudge resisting property, easy smudge removal, and fingerprint resisting property) is required, for example, on the surface of plastic or ceramic window of an automobile or train, display of a computer, TV, plasma display, cellular phone, or digital camera, protective film or plate or anti-reflection film of liquid crystal display, cover of various meters, and optical component such as touch panel.

BACKGROUND OF THE INVENTION

Optical components such as touch panels and various displays which become in contact with finger or which are operated by hand are inherently associated with the problem of visibility loss since surface of such component is easily contaminated by the oil from human body. In order to reliably maintain the components in good working order, the surface of such component is strongly demanded to have an improved smudge proof property. Silicone compounds as typically represented by dimethyl silicone oil are known to provide excellent water repellency and lubricity with the surface on which they are applied. Silicone compounds, however, are inferior in their ability of reducing surface tension compared to fluorine compounds, and accordingly, their oil repellency has been insufficient and their smudge proof property against the oil has been incomplete. In view of such situation, fluorine compounds having superior oil repellency have often been used for such purpose.

Various attempts have been made to provide an article with improved smudge proof properties including smudge resisting property, easy smudge removal, and fingerprint resisting property by applying a fluorine-containing compound on the surface of the substrate to thereby form a film having improved water and oil repellency. In such case, a fluorinated alkyl-substituted silane or a fluorinated polyether-substituted silane has been deposited on the surface of a substrate or a substrate having a protective film by vapor deposition to thereby provide the surface with water and oil repellency. When this method is adopted, the resulting smudge poof layer is a thin layer comprising oriented monomolecules, and such film has excellent smudge proof property. However, vapor deposition requires expensive installation, which is economically disadvantageous. Moreover, when a transparent plastic optical component is treated, a protective film should be formed beforehand as a countermeasure for improving the inferior scratch resistance inherent to the plastic article, and such two step method is disadvantageous in economic point of view. The situation is similar in the case of forming a thin layer of the silane hydrolysate since formation of an evenly coated monomolecular film is also difficult, and a two-step treatment with the preliminary formation of protective film is also required.

Use of a silicone resin prepared by hydrolysis of a silane compound having a fluorine-containing organic group or a mixture of such silane compound having a fluorine-containing organic group with another silane compound for the coating agent has also been proposed (see JP-A 2002-53804 (Patent Document 1)). While this method is capable of forming a film having excellent smudge proof property, the resin contains a large amount of fluorine-containing organic substituent which is not crosslinkable and which is also bulky, and the resulting film has low crosslink density, and the scratch resistance does not reach the level required for such film. In other words, the film does not reach the level that all properties required for an optical component are provided by such film, namely, by only one treatment.

In order to improve the scratch resistance, JP-A 2000-119634 (Patent Document 2) proposes a method in which a perfluoroalkyl group-containing silane is simultaneously hydrolyzed with various silane compounds such as tetraalkoxysilane; JP-B 6-29332 (Patent Document 3) proposes a method in which a perfluoroalkyl group-containing silane is used with a bissilane compound containing a perfluoroalkylene group as a spacer, and a tetraalkoxysilane; and Japanese Patent No. 2629813 (Patent Document 4) proposes a method in which a bissilane compound containing a perfluoroalkylene group as a spacer is used with an epoxy functional silane. Although these methods have realized the intended scratch resistance and adhesion at a relatively high level, the resulting film had various drawbacks in the actual use due to the reduced fluorine content. More specifically, the concentration of the fluorine-containing substituent was not higher at the surface, and as a consequence, the film was insufficient in the smudge proof property, and also, in the resistance to chemicals such as household detergent, and in particular, in the resistance to alkalis.

As described above, there has been no system capable of providing the scratch resistance which is deficient in the plastic material, the smudge resistance including the resistance to oily components from the human body, and the resistance to alkaline household detergent which is used in washing optical components in only one coating step on the plastic substrate.

SUMMARY OF THE INVENTION

In view of the situation as described above, an object of the present invention is to provide an anti-smudge agent which is used by adding to a coating composition, and which realized excellent scratch resistance and smudge proof property by one-step coating of such coating composition. Another object is to provide a smudge proof coating composition containing such anti-smudge agent, a smudge proof film produced from such composition, and an article coated with such film.

In order to achieve the objects as described above, the inventors of the present invention made an intensive study and found that a coating composition produced by adding a small amount of fluorine-containing silicone resin of predetermined structure to a coating base, and in particular, condensation-type silicone resin can simultaneously realize excellent scratch resistance and excellent smudge proof property by one-step coating when the substrate is treated with such coating composition.

It was also found that the resulting film also has excellent chemical resistance, and it is quite useful since can endure washing with a household detergent.

It was also found that, when the organic solvent in which the condensation-type silicone resin and the fluorine-containing silicone resin have dissolved volatilizes, the two resins which are essentially incompatible with each other separates into two layers, and the fluorine-containing silicone resin of the present invention moves toward the surface side to become oriented, and two layers respectively imparting different properties are thereby formed at once. As a consequence, excellent scratch resistance is imparted by the coating agent while excellent smudge proof property and chemical resistance are realized by the fluorine-containing silicone resin of the present invention. The present invention has been achieved on the bases of such finding.

Accordingly, the present invention provides the anti-smudge agent, the smudge proof coating composition, the smudge proof film, and the article coated with such smudge proof film as described below.

[1] An anti-smudge agent which is added to a coating composition for imparting smudge proof property with the coating composition, comprising a silicone resin containing a fluorine atom-containing organic group, which has a number average molecular weight of at least 1,000 and a molar ratio of the fluorine atom to the silicon atom (F/Si) of 3 to 50;

said silicone resin being the one produced by hydrolyzing or condensing an organosilicon compound having a fluorine atom-containing organic group represented by the following general formula (I):

$$R^1R^2_mSiX_{3-m} \quad (I)$$

wherein $R^1$ is a fluorine atom-containing organic substituent, $R^2$ is a substituted or unsubstituted alkyl group or phenyl group containing 1 to 10 carbon atoms, X is a hydrolyzable group or OH group, and m is 0 or 1; or a hydrolysate or a partial condensate thereof.

[2] An anti-smudge agent according the above [1] wherein the silane compound comprises (i) 50 to 100% by weight of an organosilicon compound represented by the general formula (I):

$$R^1R^2_mSiX_{3-m} \quad (I)$$

wherein $R^1$ is a fluorine atom-containing organic substituent, $R^2$ is a substituted or an unsubstituted alkyl group or phenyl group containing 1 to 10 carbon atoms, X is a hydrolyzable group or OH group, and m is 0 or 1; or a hydrolysate or a partial condensate thereof;

(ii) 50 to 0% by weight of an organosilicon compound represented by the general formula (II) and/or (III):

$$R^2_nSiX_{4-n} \quad (II)$$

$$X_{3-p}R^2_pSi-R^3-SiR^2_qX_{3-q} \quad (III)$$

wherein $R^2$ and X are as described above, $R^3$ is —O—, —(CH$_2$)$_r$—, —C$_6$H$_4$—, or a fluorine-substituted divalent organic group, n, p, and q are independently 0, 1, or 2; and r is an integer of 1 to 6; or a hydrolysate or a partial condensate thereof.

[3] An anti-smudge agent according to the above [1] or [2] wherein the organosilicon compound represented by general formula (I) is $$F(CF_2)_8-C_2H_4-Si(OCH_3)_3.$$

[4] A smudge proof coating composition which is a dispersion in an organic solvent of (1) 0.01 to 10% by weight of an anti-smudge agent of any one the above [1] to [3]; and (2) 99.99 to 90% by weight of a condensation curable silicone resin.

[5] A smudge proof coating composition according to the above [4] wherein the condensation curable silicone resin (2) is a silicone resin which is not completely compatible with the anti-smudge agent (1) in the absence of the organic solvent.

[6] A smudge proof coating composition according to the above [4] or [5] wherein the condensation curable silicone resin is the one produced by hydrolyzing and condensing the silane compound containing $$X_{3-p}R^2_pSi-R^3-SiR^2_qX_{3-q} \quad (III)$$

wherein $R^2$ and X are as described above, $R^3$ is —O—, —(CH$_2$)$_r$—, —C$_6$H$_4$—, or a fluorine-substituted divalent organic group, p and q are independently 0, 1, or 2; and r is an integer of 1 to 6; or a hydrolysate or a partial condensate thereof.

[7] A smudge proof film produced by coating and curing the smudge proof coating composition of any one of claims 4 to 7 as the outermost layer of the substrate, wherein the anti-smudge agent of any one of the above [1] to [3] is predominantly present on the surface side of the cured film.

[8] A smudge proof film produced by coating and curing the smudge proof coating composition of any one of the above [4] to [7] as the outermost layer of a substrate, wherein the anti-smudge agent of any one of the above [1] to [3] is predominantly present on the surface side of the cured film.

[9] A smudge proof film according the above [8] wherein the smudge proof film has a contact angle with oleic acid of at least 60°.

[10] A coated article wherein the smudge proof coating composition of any one of the above [4] to [7] has been coated and cured as the outermost layer of the article.

[11] A coated article according to the above [10] wherein the substrate comprises a plastic, a metal, or a ceramic.

EFFECT OF THE INVENTION

The present invention has the following features.

(First Feature)

When the coating composition having the anti-smudge agent of the present invention blended therein is used for the coating, the surface will be provided with the smudge proof property simultaneously with the functions realized by the base resin of the coating composition by one-step coating, and provision of two separate coatings is no longer necessary. This is economically by far advantageous.

(Second Feature)

An excellent smudge proof property is realized in the present invention since the fluorine-containing organic group will be oriented near the surface at a high density. As a consequence, the products of the present invention exhibit high resistance to fingerprint due to the high oil repellency, and they are useful in the applications where such property is required, for example, an anti-reflection film of liquid crystal display, plasma display, cellular phone, and the like, and optical components such as polarization plate. In addition, the film of the present invention is firmly attached to the surface by the reactive group, and therefore, the substrate is provided with a durable smudge proof property.

(Third Feature)

When the condensation curable silicone resin is used in the coating composition, the silicone resin and the coating composition react to become crosslinked and firmly bonded to each other. The surface is also provided with lubricity by the effect of the fluorine-containing organic group which is oriented at the surface, and therefore, the cured film of the silicone resin enjoys improved scratch resistance.

(Fourth Feature)

The present invention can also be used with a material used for forming a film having a low refractive index such as silicone resin synthesized from a fluorine-containing bissilane compound or a hollow silica sol, and accordingly, for an application where anti-reflection property is required.

DETAILED DESCRIPTION OF THE INVENTION

The present invention provides (i) an anti-smudge agent to be added to a coating composition, comprising a smudge proof coating composition having a particular molecular weight and a particular fluorine content produced by hydrolyzing and condensing an organosilicon compound containing a hydrolyzable silane having a fluorine atom-containing organic group, (ii) a smudge proof coating composition comprising a silicone resin which is curable by condensation and the fluorine-containing silicone resin blended in the silicone resin, and (iii) a smudge proof film produced by coating and curing the smudge proof coating composition, (iv) an article having the smudge proof film as its outermost layer.

The anti-smudge agent according to the present invention is an anti-smudge agent to be added to a coating composition for imparting smudge proof property with the coating composition, and this anti-smudge agent comprises a silicone resin produced by hydrolyzing or condensing an organosilicon compound having a fluorine atom-containing organic group represented by the following general formula (I):

$$R^1R^2_m SiX_{3-m} \quad (I)$$

wherein $R^1$ is a fluorine atom-containing organic substituent, $R^2$ is a substituted or unsubstituted alkyl group or phenyl group containing 1 to 10 carbon atoms, X is a hydrolyzable group or OH group, and m is 0 or 1; or a hydrolysate or a partial condensate thereof. The anti-smudge agent satisfies the conditions that:

it has a number average molecular weight of at least 1,000, and it has a molar ratio of the fluorine atom to the silicon atom (F/Si) of 3 to 50.

The material of the present invention is the one produced by hydrolyzing and/or condensing an organosilicon compound basically comprising a hydrolyzable silane containing a fluorine-containing organic group, or a hydrolysate or a partial condensate thereof, and it is a silicone resin having a particular molecular weight and a particular (F/Si) ratio, and it is soluble in an organic solvent. This substance uniformly dissolves when it is added to a solution of a condensation curable silicone material in an organic solvent, but undergoes micro-phase separation when the solvent is no longer present since this substance is essentially incompatible with the condensation curable silicone resin. When the solvent is no longer present, the fluorine-containing silicone resin of the present invention moves toward the surface, and the fluorine-containing silicone resin will be unevenly distributed in the region near the surface.

The fluorine atom-containing organic substituent represented by $R^1$ is preferably (A) an organic substituent substituted with a perfluoroalkyl group, or (B) an organic substituent substituted with a fluorinated polyether.

Exemplary organic substituents substituted with a perfluoroalkyl group include straight chain and/or branched groups as listed below.

$C_aF_{2a+1}$—$(CH_2)_b$— (wherein a is 1 to 16, and b is 1 to 3), $C_aF_{2a+1}$—O—$(CH_2)_b$— (wherein a is 1 to 16, and b is 1 to 3), $C_aF_{2a+1}$—COO—$(CH_2)_b$— (wherein a is 1 to 16, and b is 1 to 3), $C_aF_{2a+1}$—CONH—$(CH_2)_b$— (wherein a is 1 to 16, and b is 1 to 3), and $C_aF_{2a+1}$—SO$_2$NH—$(CH_2)_b$— (wherein a is 1 to 16, and b is 1 to 3).

Specific examples include the following substituents. The substituent, however, is not limited to such examples as long as the conditions as described above are satisfied.

$CF_3C_2H_4$—, $CF_3(CF_2)_3C_2H_4$—, $CF_3(CF_2)_3C_2H_4$—, $CF_3(CF_2)_7C_2H_4$—, $CF_3(CF_2)_9C_2H_4$—, $CF_3(CF_2)_{11}C_2H_4$—, $CF_3(CF_2)_{15}C_2H_4$—, $CF_3(CF_2)_7$—O—$C_3H_6$—, $CF_3(CF_2)_7COOC_3H_6$—, $CF_3(CF_2)_7CONHC_3H_6$—, and $CF_3(CF_2)_7SO_2NHC_3H_6$—.

Among these, the preferred are $CF_3(CF_2)_3C_2H_4$—, $CF_3(CF_2)_7C_2H_4$—, and $CF_3(CF_2)_9C_2H_4$— in view of realizing the smudge proof property and the favorable solubility in the organic solvent. In view of commercial availability, the most preferred is $CF_3(CF_2)_7C_2H_4$—.

The organic substituent substituted with a fluorinated polyether group may be any substituent containing a fluorinated polyether group generated by the polymerization of —$C_4F_8O$—, —$C_3F_6O$—, —$C_2F_4O$—, or —$CF_2O$— units, and the examples include:

$C_3F_7O(CF(CF_3)CF_2O)_cCF(CF_3)CH_2$—O—$C_3H_6$— ($0 \leq c \leq 6$), $C_3F_7O(CF(CF_3)CF_2O)_cCF(CF_3)$—CONHC$_3$H$_6$— ($0 \leq c \leq 6$), and $C_2F_5O(CF_2CF_2O)_d$—$C_3H_6$— ($0 \leq d \leq 10$).

Specific examples include the following substituents. The substituent, however, is not limited to such examples as long as the conditions as described above are satisfied.

$C_3F_7O(CF(CF_3)CF_2O)_3$—$CF(CF_3)CH_2$—$O$—$C_3H_6$—,
$C_3F_7O(CF(CF_3)CF_2O)_6$—$CF(CF_3)CH_2$—$O$—$C_3H_6$—,
$C_3F_7O(CF(CF_3)CF_2O)_6$—$CF(CF_3)$—$CONHC_3H_6$—, and
$C_2F_5O(CF_2CF_2O)_{10}$—$C_3H_6$—.

Among these, the preferred is $C_3F_7O(CF(CF_3)CF_2O)_6$—$CF(CF_3)$—$CONHC_3H_6$— in view of realizing the smudge proof property and favorable solubility in the organic solvent.

Examples for the $R^2$ include an alkyl group and phenyl group containing 1 to 10 carbon atoms such as ethyl, ethyl, propyl, isopropyl, butyl, isobutyl, tert-butyl, pentyl, hexyl, or octyl, and in particular, an unsubstituted alkyl group and phenyl group containing 1 to 6; and such substituent having one or more its hydrogen atom replaced with a group such as epoxy group, amino group, acryloxy group, methacryloxy group, and mercapto group.

Next, the substituent X is described. The substituent X represents a hydrolyzable group or OH group. Exemplary hydrolyzable groups include halogen atoms such as Cl; alkoxy groups such methoxy group, ethoxy group, propoxy group, isopropoxy group, and butoxy group; alkenoxy groups such as isopropenoxy group; acyloxy groups such as acetoxy group; ketoxime groups such as methyl ethyl ketoxime group; alkoxy alkoxy groups such as methoxy ethoxy group. Preferred are silane compounds having methoxy group or ethoxy group in view of the handling convenience and ease of controlling the reaction during the hydrolysis.

Examples of the organosilicon compound (I) having the fluorine atom-substituted organic group include $CF_3C_2H_4$—$Si(OCH_3)_3$,
$CF_3C_2H_4$—$Si(OC_2H_5)_3$,
$CF_3(CF_2)_3C_2H_4$—$Si(OCH_3)_3$,
$CF_3(CF_2)_3C_2H_4$—$Si(OC_2H_5)_3$,
$CF_3(CF_2)_5C_2H_4$—$Si(OCH_3)_3$,
$CF_3(CF_2)_7C_2H_4$—$Si(OCH_3)_3$,
$CF_3(CF_2)_7C_2H_4$—$Si(OC_2H_5)_3$,
$CF_3(CF_2)_7C_2H_4$—$SiCl_3$,
$CF_3(CF_2)_7C_2H_4$—$Si(OH)_3$,
$CF_3(CF_2)_7C_2H_4$—$Si(OCOCH_3)_3$,
$CF_3(CF_2)_7C_2H_4$—$Si(-OC(CH_3)=CH_2)_3$,
$CF_3(CF_2)_7C_2H_4$—$Si(CH_3)(OCH_3)_2$,
$CF_3(CF_2)_7C_2H_4$—$Si(C_6H_5)(OCH_3)_2$,
$CF_3(CF_2)_9C_2H_4$—$Si(OCH_3)_3$,
$CF_3(CF_2)_{11}C_2H_4$—$Si(OCH_3)_3$,
$CF_3(CF_2)_7CONHC_3H_6$—$Si(OCH_3)_3$,
$CF_3(CF_2)_7SO_2NHC_3H_6$—$Si(OCH_3)_3$,
$C_3F_7O(CF(CF_3)CF_2O)_3CF(CF_3)CONHC_3H_6$—$Si(OCH_3)_3$, and
$C_3F_7O(CF(CF_3)CF_2O)_6CF(CF_3)CONHC_3H_6$—$Si(OCH_3)_3$.

Among these, the preferred are:
$CF_3(CF_2)_3C_2H_4$—$Si(OCH_3)_3$,
$CF_3(CF_2)_7C_2H_4$—$Si(OCH_3)_3$, and
$CF_3(CF_2)_{11}C_2H_4$—$Si(OCH_3)_3$, and the most preferred is:
$CF_3(CF_2)_7C_2H_4$—$Si(OCH_3)_3$.

The silane compound as described above is hydrolyzed and/or condensed by a method known in the art to produce a product having a number average molecular weight of at least 1,000, and a molar ratio of the fluorine atom to the silicon atom (F/Si) of 3 to 50.

When the number average molecular weight is less than 1,000, the fluorine-containing organic group will not be properly oriented on the cured film and the desired smudge proof property will not be realized. When the number average molecular weight is in excess of 50,000, dispersion in the organic solvent may become insufficient to detract from the production of improved coating agent, and therefore, the number average molecular weight is preferably up to 50,000, and more preferably 1,200 to 20,000. The terminal of this molecule is SiOH group or SiX group remaining as a result of the hydrolysis, and accordingly, this molecule reacts with the condensation curable resin to become immobilized on the surface, and a highly durable smudge proof film is thereby obtained. The number average molecular weight is the value calculated in terms of polystyrene determined by gel permeation chromatography (GPC).

Molar ratio of the fluorine atom to the silicon atom is in the range of 3 to 50. When the ratio is less than 3, sufficient smudge proof property will not be realized since number of fluorine atoms present on the surface is insufficient and the oil repellency is insufficient. When the ratio is in excess of 50, hydrophobicity of the whole molecule will be excessively high and dispersion in the organic solvent will be difficult, and production of uniform film will be difficult. The molar ratio is preferably in the range of 9 to 30.

The hydrolysis may be accomplished by a method known in the art, and amount of the water used for the hydrolysis may be determined so that the resulting silicone resin has an average molecular weight of at least 1,000, and ratio of ($H_2O$/Si—X) is in the range of 0.1 to 10, preferably 0.2 to 8, and more preferably 0.5 to 5. Catalyst for the hydrolysis or catalyst for the hydrolysis and condensation curing used in the hydrolysis may be any compound known in the art, and examples include acids such as hydrochloric acid, acetic acid, and maleic acid; bases such as NaOH, amine compounds such as ammonia, triethylamine, dibutylamine, hexylamine, octylamine, and dibutylamine, and salts of such amine compound, and quaternary ammonium salts such as benzyltriethylammonium chloride, tetramethylammonium hydroxide, tetrabutylammonium hydroxide, and tetrabutylammonium acetate; fluoride salts such as potassium fluoride and sodium fluoride; solid acidic catalyst or solid basic catalyst (for example, ion-exchange resin catalyst); organometallic compound such metal salts of an organic carboxylic acid such as iron-2-ethyl hexoate, titanium naphthenate, zinc stearate, and dibutyl tin diacetate, organic titanium esters such as tetrabutoxy titanium, tetra-i-propoxy titanium, dibutoxy-(bis-2,4-pentanedionato)titanium, and di-i-propoxy(bis-2,4-pentanedionato)titanium, organic zirconium esters such as tetrabutoxy zirconium, tetra-i-propoxy zirconium, dibutoxy(bis-2,4-pentanedionato)zirconium, and di-i-propoxy(bis-2,4-pentanepentanedionato)zirconium, alkoxy aluminum compounds such as aluminum triisopropoxide, aluminum chelate compounds such as aluminum acetylacetonate complex; and aminoalkyl-substituted alkoxysilane such as γ-aminopropyltrimethoxysilane, γ-aminopropyltriethoxysilane, N-(β-aminoethyl)-γ-aminopropyltrimethoxysilane, and N-(β-aminoethyl)-γ-aminopropyltriethoxysilane, which may be used alone or in combination of two or more.

While the anti-smudge agent of the present invention may be produced by using a silicone resin produced by hydrolyzing and condensing solely the organosilicon compound represented by the formula (I) or its hydrolysate or partial condensate, it may also be produced by using a silicone resin produced by hydrolyzing and/or condensing the organosilicon compound represented by the formula (I) or its hydrolysate or partial condensate mixed with the organosilicon compound represented by the general formula (II) and/or (III), or its hydrolysate or partial condensate.

Next, the organosilicon compound represented by the general formula (II) and/or (III) which may be additionally used in producing the silicone resin of the present invention is described.

$$R^2{}_n SiX_{4-n} \quad (II)$$

$$X_{3-p}R^2{}_p Si\text{—}R^3\text{—}SiR^2{}_q X_{3-q} \quad (III)$$

In the formulae, $R^2$ and X are as defined above; $R^3$ is —O—, —(CH$_2$)$_r$—, —C$_6$H$_4$—, or a fluorine-substituted divalent organic group; n, p, and q are independently 0, 1, or 2; and r is an integer of 1 to 6.

Examples of the organosilicon compound represented by the general formula (II) include silicates such as tetraethoxy silane; alkyl silanes such as methyltrimethoxysilane, methyltrichlorosilane, hexyltrimethoxysilane, decyltrimethoxysilane, and dimethyldimethoxysilane, phenyl silanes such as phenyltrimethoxysilane and phenylmethyldimethoxy silane, silane coupling agents such as γ-glycidoxypropyltrimethoxysilane, γ-glycidoxypropylmethyldiethoxysilane, γ-aminopropyltriethoxysilane, γ-methacryloxy propyltrimethoxysilane, γ-acryloxypropyltrimethoxysilane, and γ-mercaptopropyltrimethoxysilane, partial hydrolysate and condensate thereof. When the organosilicon compound is a tetraalkoxysilane or a silane coupling agent, such compound should be carefully introduced to the extent not reducing the anti-alkali resistance because such substance makes the entire film hydrophilic and susceptible attack by the alkali.

Next, the organosilicon compound represented by the following general formula (III) is described.

$$X_{3-p}R^2{}_p Si\text{—}R^3\text{—}SiR^2{}_q X_{3-q} \quad (III)$$

In the formula, $R^2$ and X are as defined above; $R^3$ is —O—, —(CH$_2$)$_r$—, —C$_6$H$_4$—, or a fluorine-substituted divalent organic group; n, p, and q are independently 0, 1, or 2; and r is an integer of 1 to 6.

$R^3$ is —O—, —(CH$_2$)$_r$—, —C$_6$H$_4$—, or a divalent organic group substituted with fluorine. Exemplary fluorine-substituted divalent organic groups include fluorine-substituted alkylene groups containing at least 1 fluorine atom and 6 to 30 carbon atoms, and in particular, 8 to 22 carbon atoms, and fluorine-substituted alkylene group containing at least 1 ether bond (—O—). Specific examples include:
—C$_2$H$_4$—(CF$_2$)$_n$—C$_2$H$_4$—,
—C$_2$H$_4$—CF(CF$_3$)—(CF$_2$)$_n$—CF(CF$_3$)—C$_2$H$_4$—,
—C$_2$H$_4$—CF(C$_2$F$_5$)—(CF$_2$)$_n$—CF(C$_2$F$_5$)—C$_2$H$_4$—,
—C$_2$H$_4$—CF(CF$_3$)CF$_2$—O(CF$_2$)$_n$O—CF$_2$CF(CF$_3$)—C$_2$H$_4$—
(wherein n is 2 to 20),
—C$_2$H$_4$—C$_6$F$_{10}$—C$_2$H$_4$—, and
—C$_2$H$_4$—C$_6$F$_4$—C$_2$H$_4$—.

n should be in the range of 2 to 20, and more preferably 4 to 12. When n is 1, smudge proof property and alkaline resistance will be insufficient, and when n is in excess of 20, scratch resistance and smudge proof property will be insufficient due to the reduced crosslink density.

Examples of the bissilane compound satisfying the conditions as described above include
(CH$_3$O)$_3$Si—C$_2$H$_4$—(CF$_2$)$_4$—C$_2$H$_4$—Si(OCH$_3$)$_3$,
(CH$_3$O)$_3$Si—C$_2$H$_4$—(CF$_2$)$_6$—C$_2$H$_4$—Si(OCH$_3$)$_3$,
(CH$_3$O)$_3$Si—C$_2$H$_4$—(CF$_2$)$_8$—C$_2$H$_4$—Si(OCH$_3$)$_3$,
(CH$_3$O)$_3$Si—C$_2$H$_4$—(CF$_2$)$_{10}$—C$_2$H$_4$—Si(OCH$_3$)$_3$,
(CH$_3$O)$_3$Si—C$_2$H$_4$—(CF$_2$)$_{16}$—C$_2$H$_4$—Si(OCH$_3$)$_3$,
(C$_2$H$_5$O)$_3$Si—C$_2$H$_4$—(CF$_2$)$_4$—C$_2$H$_4$—Si(OC$_2$H$_5$)$_3$,
(C$_2$H$_5$O)$_3$Si—C$_2$H$_4$—(CF$_2$)$_6$—C$_2$H$_4$—Si(OC$_2$H$_5$)$_3$,
(CH$_3$O)$_2$(CH$_3$)Si—C$_2$H$_4$—(CF$_2$)$_4$—C$_2$H$_4$—Si(CH$_3$)(OCH$_3$)$_2$,
(CH$_3$O)$_2$(CH$_3$)Si—C$_2$H$_4$—(CF$_2$)$_6$—C$_2$H$_4$—Si(CH$_3$)(OCH$_3$)$_2$,
(CH$_3$O)(CH$_3$)$_2$Si—C$_2$H$_4$—(CF$_2$)$_4$—C$_2$H$_4$—Si(CH$_3$)$_2$(OCH$_3$),
(C$_2$H$_5$O)(CH$_3$)$_2$Si—C$_2$H$_4$—(CF$_2$)$_6$—C$_2$H$_4$—Si(CH$_3$)$_2$(OC$_2$H$_5$),
(CH$_3$O)$_3$Si—C$_2$H$_4$—CF(CF$_3$)—(CF$_2$)$_4$—CF(CF$_3$)—C$_2$H$_4$—Si(OCH$_3$)$_3$,
(CH$_3$O)$_3$Si—C$_2$H$_4$—CF(CF$_3$)—(CF$_2$)$_8$—CF(CF$_3$)—C$_2$H$_4$—Si(OCH$_3$)$_3$, and
(CH$_3$O)$_3$Si—C$_2$H$_4$—CF(CF$_3$)—(CF$_2$)$_{12}$—CF(CF$_3$)—C$_2$H$_4$—Si(OCH$_3$)$_3$.

Among these, the bissilane compounds preferable for use include:
(CH$_3$O)$_3$Si—C$_2$H$_4$—(CF$_2$)$_4$—C$_2$H$_4$—Si(OCH$_3$)$_3$,
(CH$_3$O)$_3$Si—C$_2$H$_4$—(CF$_2$)$_6$—C$_2$H$_4$—Si(OCH$_3$)$_3$,
(CH$_3$O)$_3$Si—C$_2$H$_4$—(CF$_2$)$_8$—C$_2$H$_4$—Si(OCH$_3$)$_3$,
(C$_2$H$_5$O)$_3$Si—C$_2$H$_4$—(CF$_2$)$_4$—C$_2$H$_4$—Si(OC$_2$H$_5$)$_3$, and
(C$_2$H$_5$O)$_3$Si—C$_2$H$_4$—(CF$_2$)$_6$—C$_2$H$_4$—Si(OC$_2$H$_5$)$_3$.

The organosilicon compound represented by the general formula (I) or its hydrolysate or partial condensate and the organosilicon compound represented by the general formula (II) and/or (III) or its hydrolysate or partial condensate are preferably used at a ratio of 50 to 100% by weight to 50 to 0% by weight. When the ratio of the organosilicon compound represented by the general formula (I) is low, smudge proof property will be insufficient, and therefore, the ratio of the organosilicon compound represented by the general formula (I) is preferably 70 to 100% by weight, and more preferably 90 to 100% by weight. When the organosilicon compound represented by the formula (II) and/or (III) is also used, the organosilicon compound represented by the formula (II) and/or (III) is preferably used at least at 1% by weight, and in particular, at least at 2% by weight.

Next, the smudge proof coating composition of the present invention is the composition produced by dispersing and dissolving the anti-smudge agent and the condensation curable silicone resin in an organic solvent.

Next, the condensation curable silicone resin which is used by adding the anti-smudge agent of the present invention is described. In view of the mechanism how the smudge proof property is realized in the present invention, the condensation curable silicone resin is preferably a silicone resin which is not completely compatible with the anti-smudge agent in the absence of the organic solvent. When such condition is fulfilled, the anti-smudge agent will move toward the outermost layer region in the absence of the solvent, and the anti-smudge agent will be distributed unevenly, and more specifically, predominantly in the surface region. As a consequence, the function of the protective film having a high hardness ascribable to the condensation curable silicone resin layer, and the smudge proof function ascribable to the anti-smudge agent of the present invention will be simultaneously realized by the one coating. However, when the anti-smudge agent and the condensation curable silicone resin are dissolved in an organic solvent, they need to be uniformly dissolved.

Any condensation curable silicone resin may be used as long as the condition as described above is fulfilled, and the condensation curable silicone resin should have a group which reacts by condensation on the terminal of the molecule. Exemplary such groups include OH group, alkoxy groups such as methoxy group, ethoxy group, propoxy group, isopropoxy group, and butoxy group, alkenoxy groups such as isopropenoxy group, acyloxy groups such as acetoxy group, ketoxime groups such as methylethylketoxime group, alkoxyalkoxy groups such as methoxyethoxy group, isocyanate group, and silazane group which are bonded to the silicon atom.

The silicone resin can be used when it has a degree of polymerization in the range of 2 to 1,000, more preferably 2 to 500, and most preferably 2 to 100. When a monomer having the degree of polymerization of 1 is used, the monomer will be volatized in the course of curing, and application of a constant coating will be difficult and this is economically disadvantageous. On the other hand, when the degree of polymerization is too high, viscosity will be unduly high and uniform application of the coating will be difficult.

Examples of the monovalent organic substituent $R^4$ bonded to the silicon atom of the condensation curable silicone resin which is not the group that reacts by condensation include organic functional groups such as alkyl groups such as methyl group, ethyl group, propyl group, butyl group, hexyl group, and cyclohexyl group; phenyl group; halogen-substituted alkyl groups such as trifluoropropyl group, perfluorobutylethyl group and perfluorooctylethyl group; epoxy functional groups such as glycidoxypropyl group and 3,4-epoxycyclohexylethyl group; acryl functional groups such as methacryloxypropyl group and acryloxypropyl group; acryl functional groups such as methacryloxymethyl group; mercapto functional groups such as mercapto functional group; and amino functional groups such as aminopropyl group, aminoethyl aminopropyl group, and N-phenyl-aminopropyl group. Examples of the divalent organic substituents include alkylene groups such as methylene group, ethylene group, butylene group, hexylene group, and decylene group; phenylene group; aromatic ring-containing groups such as —$C_2H_4$—$C_6H_4$—$C_2H_4$—; the fluorine-containing divalent organic groups represented by $R^3$ as described above such as —$C_2H_4$—$(CF_2)_n$—$C_2H_4$—, —$C_2H_4$—$CF(CF_3)$—$(CF_2)_n$—$CF(CF_3)$—$C_2H_4$—, —$C_2H_4$—$CF(C_2F_5)$—$(CF_2)_n$—$CF(C_2F_5)$—$C_2H_4$—, —$C_2H_4$—$CF(CF_3)CF_2$—$O(CF_2)_nO$—$CF_2CF(CF_3)$—$C_2H_4$— (wherein n is 2 to 20), —$C_2H_4$—$C_6F_{10}$—$C_2H_4$—, and —$C_2H_4$—$C_6F_4$—$C_2H_4$—. For producing a film having a low refractive index, use of a fluorine-containing divalent organic group is preferable.

In this case, the condensation curable silicone resin used may be the one produced by hydrolyzing and condensing the silane compound represented by the following formula (IV) and/or (III):

$$R^4_a SiX_{4-a} \quad (IV)$$

wherein $R^4$ is the monovalent organic group as defined above, X is the hydrolyzable group as defined above, a is 1, 2, or 3, and in particular, 1 or 2, and $$X_{3-p}R^2_p Si—R^3—SiR^2_q X_{3-q} \quad (III)$$

wherein $R^2$, X, p, and q are as defined above.

When the bissilane compound represented by the general formula (III) is used, the film will be provided with an excellent hardness, and hence, the film will be simultaneously provided with the improved scratch resistance and reduced refractive index. Accordingly, use of the bissilane compound represented by the general formula (III) is preferable when a film having a low refractive index is desirable.

The structural unit may comprise any of the M unit, D unit, T unit, and Q unit in which the number of the group which corresponds to SiOH group, SiX group and/or siloxane crosslink group is 1, 2, 3, 4, respectively.

As described above, the coating composition of the present invention contains the anti-smudge agent and the condensation curable silicone resin. The ratio of the anti-smudge agent and the condensation curable silicone resin is such that the anti-smudge agent is 0.01 to 10% by weight, preferably 0.02 to 8% by weight, and more preferably 0.05 to 5% by weight, and the condensation curable silicone resin is 99.99 to 90% by weight, preferably 99.98 to 92% by weight, and more preferably 99.95 to 95% by weight in relation to 100% by weight of the total of the anti-smudge agent and the condensation curable silicone resin.

The coating composition of the present invention comprises the anti-smudge agent and the condensation curable silicone resin dispersed and dissolved in an organic solvent. Exemplary organic solvents include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, and propylene glycol monoethyl ether; ketones such as acetone, methyl ethyl ketone, methyl isobutyl ketone, and acetyl acetone; esters such as ethyl acetate, butyl acetate, and ethyl acetoacetate; xylene; and toluene. The organic solvent is used at an amount so that total concentration of the anti-smudge agent and the condensation curable silicone resin is 0.1 to 10% by weight, and in particular, 0.5 to 8% by weight.

The coating composition may further comprise an inorganic oxide fine particles for the purpose of adjusting physical properties of the film such as hardness, scratch resistance, electroconductivity, degree of heat ray blockage, and refractive index. Exemplary such inorganic oxide fine particles include those comprising silica, aluminum oxide, titanium oxide, zinc oxide, zirconium oxide, cerium oxide, tin oxide, indium oxide, or combination thereof, and porous and/or hollow inorganic oxide fine particles. Among these, the preferred is use of colloidal silica and porous and/or hollow silica sol film when the film is desired to have a low refractive index. Use of titanium oxide, tin oxide, zinc oxide, and the like is preferred when a high refractive index should be provided with the film, and use of titanium oxide, indium oxide, combination thereof, and the like is preferred for imparting electroconductivity with the film. The inorganic fine particles preferably has an average primary particle diameter of 0.001 to 0.1 μm, and more preferably 0.001 to 0.08 μm. When the average primary particle diameter is in excess of 0.1 μm, the cured film formed from the resulting composition is likely to have a reduced transparency. The inorganic oxide fine particles may optionally have their surface treated with an organometallic compound such as silane, titanium, aluminum, or zirconium coupling agent.

When the inorganic oxide fine particles are incorporated, the amount added is typically 0 to 100 parts by mass, and preferably 0.1 to 80 parts by mass calculated in terms of solid content in relation to 100 parts by mass of the condensation curable silicone resin. When the inorganic oxide fine particles are added at an amount in excess of 100 parts by mass, the cured film formed from the resulting composition may suffer from the loss of transparency.

The inorganic oxide fine particles are generally used as a dispersion in a dispersion medium, which is typically water or an organic solvent. When water is used as a dispersion medium for the inorganic oxide fine particles, the dispersion medium is preferably adjusted to pH 2 to 10, and preferably to pH 3 to 7. The organic solvents suitable for use as a dispersion medium for the inorganic oxide fine particles include alcohols such as methanol, isopropyl alcohol, ethyleneglycol, butanol, and ethyleneglycol monopropyl ether, ketones such as methyl ethyl ketone and methyl isobutyl ketone, aromatic hydrocarbons such as toluene and xylene, amides such as dimethylformamide, dimethyl acetamide, and N-methyl pyrrolidone, esters such as ethyl acetate, butyl acetate, and γ-butyrolactone, ethers such as tetrahydrofuran and 1,4-dioxane, and β-diketone, and β-keto ester such as acetyl acetone and ethyl acetoacetate. Among these, the preferred are an alcohol and a ketone, and the organic solvent used as the dispersion medium may be used either alone or in combination of two or more.

The thus produced coating composition of the present invention may further comprise adequately selected additional components such as an organic or inorganic UV absorbent, a leveling agent, a buffer for controlling pH of the system to the range of 2 to 7 for facilitating stable presence of the silanol group, for example, acetic acid-sodium acetate and disodium hydrogenphosphate. The catalyst used for the condensation curing may be the one described for the condensation curing in the preparation of the anti-smudge agent.

The present invention also provides a film produced by coating and curing the smudge proof coating composition as described above as the outermost layer of the substrate, and this film has the feature that the anti-smudge agent of the present invention is predominantly present near the surface of the cured film. As a consequence, contact angle of the smudge proof film against the oleic acid of at least 60° is realized to provide excellent smudge proof property with the product. More preferably, the contact angle with the oleic acid is at least 70°, and when the contact angle is in such range, the smudge proof property will be further improved and removal of the fingerprint will be facilitated. While there is no particular upper limit for the contact angle with the oleic acid, the contact angle is typically up to 150°, and most particularly, up to 120°.

The substrate onto which the coating composition of the present invention is coated is preferably a glass, a ceramic material, a metal, or a plastic. When the substrate is transparent, it can be used for optical applications. Exemplary non-limiting plastics include polycarbonate resins, polyalkylene terephthalate resins such as polyethylene terephthalate (PET), cellulosic resins such as diacetyl cellulose, acetate butyrate cellulose, and triacetyl cellulose, acryl resins, polystyrene resins, polyimide resins, polyester resins, polyethersulfone resins, liquid crystalline resins such as polyallylate, polyurethane resins, polysulfone resins, polyetherketone resins, polyolefin resins such as trimethyl pentene and polyvinyl norbornene, sulfur-containing highly refractive resins, and combination of such resins. The most preferred is a transparent substrate which needs to be smudge proof such as a polycarbonate resin, a polyalkylene terephthalate resin such as PET, or a triacetyl cellulose resin. The substrate may be either a molded articles, a plate, or a film.

The cured film formed by using the coating composition of the present invention may have a film thickness of 0.1 nm to 100 μm, and most preferably 0.5 nm to 20 μm. The method used for coating the coating composition of the present invention on the surface of the substrate is not particularly limited, and exemplary methods include dipping, spin coating, flow coating, spray coating, and screen printing. In view of easy control of the film thickness, the preferred are dipping, spray coating, and roll coating, by which the film is deposited to a predetermined thickness.

The surface of the substrate on which the smudge proof coating agent of the present invention is applied may be preliminarily provided with a metal oxide layer or a resin layer containing a Si—X group wherein X is a hydrolyzable group or OH group. Provision of such layer is particularly effective when the substrate is a plastic substrate because excellent adhesion will be realized by such layer. Exemplary preferable metal oxides include $SiO_2$, $TiO_2$, $ZrO_2$, $InO_2$, $Al_2O_3$, ZnO, $CeO_2$, $SnO_2$, $HfO_2$, and $Sb_2O_5$, and such metal oxide may be deposited on the substrate surface, for example, by vapor deposition such as CVD, sputtering, or coating by sol-gel method. Exemplary resins containing the Si—X group include organic resins such as acrylic resin, polyester resin, epoxy resin, or alkide resin modified with silicone resin, an acryl resin copolymerized with a hydrolyzable silane compound having an unsaturated double bond, and an organosilicon oligomer or a silicone resin containing the Si—X group.

EXAMPLES

Next, the present invention is described in detail by referring to the Preparation Examples, Examples, and Comparative Examples, which by no means limit the scope of the present invention. In the following Examples, "%" refers to "% by weight", and "part" refers to "part by mass". Also, in the present invention, "average molecular weight" is the number average molecular weight in terms of polystyrene determined in gel permeation chromatography (hereinafter referred to as GPC).

Preparation Example 1

To a 1 liter flask equipped with a stirrer, a condenser, and a thermometer, 56.8 g (0.10 mole) of $C_8F_{17}CH_2CH_2Si(OCH_3)_3$ (A) and 57 g of methanol were added, and the mixture was stirred at 25° C. 7.2 g (0.4 mole) of 0.1N aqueous solution of HCl was added dropwise to this mixture for 10 minutes. After the completion of the dropwise addition, the mixture was stirred at 25° C. for 2 hours to complete the hydrolysis. To this mixture, 0.2 g of aluminum acetylacetonate was added, and the mixture was stirred at 40° C. for 5 hours to complete the condensation. After adding 130 g of ethanol, the mixture was diluted to prepare anti-smudge agent solution (1). Non-volatile content of this solution (105° C.×3 hours) was 20.6%.

When this product was analyzed by GPC, it had a number average molecular weight of 1,610 and a F/Si (molar ratio) of 17.

Preparation Example 2

The procedure of Preparation Example 1 was repeated except that the organosilicon compound (A) was replaced with a mixture of 28.4 g (0.05 mole) of the organosilicon compound (A) and 13.1 g (0.05 mole) of $C_{10}H_{21}Si(OCH_3)_3$ (B) to prepare anti-smudge agent solution (2). Mass ratio of the organosilicon compound (A) in the silane mixture was 68.4%.

When this product was analyzed by GPC, it had a number average molecular weight of 2,350 and a F/Si (molar ratio) of 8.5.

Preparation Example 3

The procedure of Preparation Example 1 was repeated except that the organosilicon compound (A) was replaced with a mixture of 45.4 g (0.08 mole) of the organosilicon compound (A) and 10.0 g (0.02 mole) of the bissilane (C) as shown below to prepare anti-smudge agent solution (3). Mass ratio of the organosilicon compound (A) in the silane mixture was 81.9%.

When this product was analyzed by GPC, it had a number average molecular weight of 3,870 and a F/Si (molar ratio) of 12.7.

$$(CH_3O)_3Si-C_2H_4-C_4F_8-C_2H_4-Si(OCH_3)_3 \quad (C)$$

Preparation Example 4

The procedure of Preparation Example 1 was repeated except that the organosilicon compound (A) was replaced with a mixture of 45.4 g (0.08 mole) of the organosilicon compound (A) and 12.1 g (0.02 mole) of the silane (D) as shown below to prepare anti-smudge agent solution (4). Mass ratio of the organosilicon compound (A) in the silane mixture was 79.0%.

When this product was analyzed by GPC, it had a number average molecular weight of 2,140 and a F/Si (molar ratio) of 17.

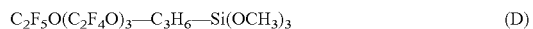

$$C_2F_5O(C_2F_4O)_3\text{—}C_3H_6\text{—}Si(OCH_3)_3 \quad (D)$$

Comparative Preparation Example 1

The procedure of Preparation Example 1 was repeated except that the addition of aluminum acetylacetonate and the subsequent heating with stirring were omitted to prepare anti-smudge agent solution (5).

When this product was analyzed by GPC, it had a number average molecular weight of 680.

Comparative Preparation Example 2

The procedure of Preparation Example 2 was repeated except that the organosilicon compound (A) was replaced with a mixture of 5.68 g (0.01 mole) of the organosilicon compound (A) and 23.6 g (0.09 mole) of $C_{10}H_{21}Si(OCH_3)_3$ (B) to prepare anti-smudge agent solution (6). Mass ratio of the organosilicon compound (A) in the silane mixture was 19.4%.

When this product was analyzed by GPC, it had a number average molecular weight of 2,610 and a F/Si (molar ratio) of 1.7.

Preparation Example 5

To a 3 liter flask equipped with a stirrer, a condenser, and a thermometer, 99.6 g (0.20 mole) of the bissilane (C) and 398 g of t-butanol were added, and the mixture was stirred at 25° C. 36 g (2.0 moles) of 0.1N aqueous solution of HCl was added dropwise to this mixture for 10 minutes. Although the mixture was white immediately after the dropwise addition, exothermic reaction gradually proceeded, and after 1 hour, the reaction system became transparent with the completion of the hydrolysis. The reaction system was further heated at 40° C. for 3 hours for ripening. After diluting with ethanol, 0.1 g of polyether-modified silicone was added as a leveling agent to prepare coating solution (7) having a non-volatile content of 4%.

Preparation Example 6

To a 2 liter flask equipped with a stirrer, a condenser, and a thermometer, 136 g (1.0 mole) of $CH_3Si(OCH_3)_3$, 200 g of ethanol, and 8 g of solid acid catalyst were added, and the mixture was stirred at 25° C. 72 g (4.0 moles) of ion exchanged water was added dropwise to this mixture for 20 minutes. Although the mixture was white immediately after the dropwise addition, exothermic reaction gradually proceeded, and after 1 hour, the reaction system became transparent with the completion of the hydrolysis. The reaction system was further heated at 40° C. for 3 hours for ripening. After filtration for the removal of the solid acid catalyst and dilution with ethanol, 0.1 g of polyether-modified silicone was added as a leveling agent to prepare coating solution (8) having a non-volatile content of 20%.

Example 1

0.5 g of aluminum acetylacetonate as a curing catalyst, and then, 1 g of the anti-smudge agent solution (1) was added to 100 g of the coating solution (7), and the mixture was fully stirred to prepare treating solution (A). A glass plate was washed to clean the surface, and immersed in the treating solution (A) so that the surface is coated to a thickness (after curing) of about 0.1 μm. After air drying for 10 minutes, the coating was cured by heating to 80° C. for 60 minutes to thereby provide a cured film on the glass substrate.

When this cured film was measured for its contact angle with water (with a contact angle meter manufactured by Kyowa Interface Science Co., Ltd.), a favorable value of 110° was measured to indicate a high water repellency. The contact angle with oleic acid measured in a similar manner was also as high as 75°.

The cured film was marked with a black oil-base felted marker, and then, wiped with a tissue paper. The marking could be completely removed, indicating high smudge removability. Next, the film surface was wiped back and forth ten times with an absorbent cotton impregnated with toluene, and then back and forth three times with a freshly prepared toluene-impregnated absorbent cotton. When this surface was subjected to the test with the oil-base felted marker, the marking could be completely removed again, indicating the durability of the film. Smudge proof property and its durability was also evaluated in a similar manner by using sebum on the finger (fingerprint) of human, and the excellent smudge proof property was again confirmed.

<Criteria>

A: complete removal of the fingerprint

B: partial removal of the fingerprint

C: unable to remove the fingerprint

0000 steel wool was mounted on a reciprocal scratch tester (manufactured by KNT Co., Ltd.), and the steel wool was moved back and forth 50 times under a load of 200 g/cm², and the surface of the cured film was observed. No scratch was found on the surface, indicating excellent scratch resistance.

<Visual Inspection>

A: no scratch

B: several scratches

C: many scratches

As described above, excellent smudge proof property and scratch resistance were simultaneously provided with the substrate by the one-step coating treatment.

Examples 2 to 5 and Comparative Examples 1 and 2

Treating solutions were prepared by repeating the procedure of Example 1 and using the formulation as shown below. The products were evaluated by the same tests as Example 1. The results are shown in Table 1.

TABLE 1

| | | Example No. | | | | | Comparative Example | |
|---|---|---|---|---|---|---|---|---|
| | | 1 | 2 | 3 | 4 | 5 | 1 | 2 |
| Coating solution | | 7 | 7 | 7 | 7 | 8 | 7 | 7 |
| Anti-smudge agent | | 1 | 2 | 3 | 4 | 1 | 5 | 6 |
| Contact angle with water (°) | | 110 | 107 | 108 | 105 | 107 | 103 | 96 |
| Contact angle with oleic acid (°) | | 75 | 73 | 75 | 70 | 73 | 74 | 52 |
| Resistance to oil-based marker pen | Initial | A | A | A | A | A | A | A |
| | After wiping with toluene | A | A | A | A | A | B | B |
| Finger print resistance | Initial | A | A | A | A | A | B | C |
| | After wiping with toluene | A | A | A | A | A | C | C |
| Scratch resistance | | A | A | A | A | A | A | A |

Japanese Patent Application No. 2006-112110 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A smudge proof coating composition which is a dispersion in an organic solvent of
(1) 0.01 to 10% by weight of an anti-smudge agent comprising a silicone resin containing a fluorine atom-containing organic group, which has a number average molecular weight of at least 1,000 and a molar ratio of the fluorine atom to the silicon atom (F/Si) of 3 to 50; said silicone resin being the one produced by hydrolyzing or condensing an organosilicon compound having a fluorine atom-containing organic group represented by the following general formula (I):

$$R^1R^2{}_mSiX_{3-m} \quad (II)$$

wherein $R^1$ is a fluorine atom-containing organic substituent, $R^2$ is a substituted or unsubstituted alkyl group or phenyl group containing 1 to 10 carbon atoms, X is a hydrolyzable group or OH group, and m is 0 or 1; or a hydrolysate or a partial condensate thereof; and
(2) 99.99 to 90% by weight of a condensation curable silicone resin.

2. A smudge proof coating composition according to claim 1 wherein the condensation curable silicone resin (2) is a silicone resin which is not completely compatible with the anti-smudge agent (1) in the absence of the organic solvent.

3. A smudge proof coating composition according to claim 1 wherein the condensation curable silicone resin is the one produced by hydrolyzing and condensing the silane compound containing $$X_{3-p}R^2{}_pSi-R^3-SiR^2{}_qX_{3-q} \quad (III)$$

wherein $R^2$ and X are as described above, $R^3$ is —O—, —(CH$_2$)$_r$—, —C$_6$H$_4$—, or a fluorine-substituted divalent organic group, p and q are independently 0, 1, or 2; and r is an integer of 1 to 6; or a hydrolysate or a partial condensate thereof.

4. A smudge proof coating composition according to claim 1 further comprising an inorganic material which is selected from inorganic oxide fine particles and hollow and/or porous inorganic oxide fine particles.

5. A smudge proof film produced by coating and curing a smudge proof coating composition as the outermost layer of a substrate,
the smudge proof coating composition being a dispersion in an organic solvent of
(1) 0.01 to 10% by weight of an anti-smudge agent comprising a silicone resin containing a fluorine atom-containing organic group, which has a number average molecular weight of at least 1,000 and a molar ratio of the fluorine atom to the silicon atom (F/Si) of 3 to 50;
said silicone resin being the one produced by hydrolyzing or condensing an organosilicon compound having a fluorine atom-containing organic group represented by the following general formula (I):

$$R^1R^2{}_mSiX_{3-m} \quad (I)$$

wherein $R^1$ is a fluorine atom-containing organic substituent. $R^2$ is a substituted or unsubstituted alkyl group or phenyl group containing 1 to 10 carbon atoms, X is a hydrolyzable group or OH group, and m is 0 or 1; or a hydrolysate or a partial condensate thereof; and
(2) 99.99 to 90% by weight of a condensation curable silicone resin,
wherein said anti-smudge agent is predominantly present on the surface side of the cured film.

6. A smudge proof film according claim 5 wherein the smudge proof film has a contact angle with oleic acid of at least 60°.

7. A coated article wherein the smudge proof coating composition of claim 1 has been coated and cured as the outermost layer of the article.

8. A coated article according to claim 7 wherein the substrate comprises a plastic, a metal, or a ceramic.

9. A smudge proof coating composition according to claim 1 wherein the silicone resin of the anti-smudge agent is the one produced by hydrolyzing or condensing a silane compound comprising
(i) 50 to 100% by weight of an organosilicon compound represented by the general formula (I):

$$R^1R^2{}_mSiX_{3-m} \quad (I)$$

wherein $R^1$ is a fluorine atom-containing organic substituent, $R^2$ is a substituted or an unsubstituted alkyl group or phenyl group containing 1 to 10 carbon atoms, X is a hydrolyzable group or OH group, and m is 0 or 1; or a hydrolysate or a partial condensate thereof;

(ii) 50 to 0% by weight of an organosilicon compound represented by the general formula (II) and/or (III):

$$R^2_n SiX_{4-n} \quad (II)$$

$$X_{3-p}R^2_p Si-R^3-SiR^2_q X_{3-q} \quad (III)$$

wherein $R^2$ and $X$ are as described above, $R^3$ is —O—, —(CH$_2$)$_r$—, —C$_6$H$_4$—, or a fluorine-substituted divalent organic group, n, p, and q are independently 0, 1, or 2; and r is an integer of 1 to 6; or a hydrolysate or a partial condensate thereof.

10. A smudge proof coating composition according to claim 1 wherein the organosilicon compound represented by general formula (I) is $$F(CF_2)_8-C_2H_4-Si(OCH_3)_3.$$

* * * * *